United States Patent
Prasannavenkatesan et al.

(10) Patent No.: US 10,166,590 B2
(45) Date of Patent: Jan. 1, 2019

(54) HIGH SPEED BLOW FORMING PROCESSES

(71) Applicant: Tesla Motors, Inc., Palo Alto, CA (US)

(72) Inventors: Rajesh Prasannavenkatesan, San Jose, CA (US); Matthew Parker, Oakland, CA (US); Yvon Laplante, Valcourt (CA); Nicolas Bombardier, Sherbrooke (CA); Ben Rush, San Jose, CA (US); Shi Li, Dublin, CA (US)

(73) Assignee: Tesla, Inc., Palo Alto, CA (US)

( * ) Notice: Subject to any disclaimer, the term of this patent is extended or adjusted under 35 U.S.C. 154(b) by 752 days.

(21) Appl. No.: 14/865,625

(22) Filed: Sep. 25, 2015

(65) Prior Publication Data

US 2017/0087617 A1     Mar. 30, 2017

(51) Int. Cl.

| | |
|---|---|
| B21D 22/10 | (2006.01) |
| B21D 26/027 | (2011.01) |
| B21D 22/20 | (2006.01) |
| B21D 26/02 | (2011.01) |
| B21D 37/16 | (2006.01) |
| B21D 26/021 | (2011.01) |
| B25J 15/06 | (2006.01) |
| B21D 26/031 | (2011.01) |
| B21D 26/053 | (2011.01) |

(52) U.S. Cl.
CPC .......... *B21D 26/027* (2013.01); *B21D 22/10* (2013.01); *B21D 22/201* (2013.01); *B21D 26/02* (2013.01); *B21D 26/021* (2013.01); *B21D 26/031* (2013.01); *B21D 26/053* (2013.01); *B21D 37/16* (2013.01); *B25J 15/0616* (2013.01)

(58) Field of Classification Search
CPC ...... B21D 22/10; B21D 37/16; B21D 22/201; B21D 26/021; B21D 26/027; B21D 26/031; B21D 26/053; C03B 23/03; B25J 15/0616

USPC ........................................................ 72/60
See application file for complete search history.

(56) References Cited

U.S. PATENT DOCUMENTS

| | | |
|---|---|---|
| 4,460,657 A | 7/1984 | Elrod |
| 4,708,730 A | 11/1987 | Ziegler et al. |
| 5,605,586 A | 2/1997 | Bekki |
| 5,974,847 A | 11/1999 | Saunders et al. |
| 6,272,894 B1 | 8/2001 | Hudson |
| 6,810,709 B2 | 11/2004 | Hammer |

(Continued)

OTHER PUBLICATIONS

International Searching Authority; International Search Report and Written Opinion; International Application No. PCT/US2016/052765; dated Dec. 28, 2016; 12 pgs.

*Primary Examiner* — David B Jones
(74) *Attorney, Agent, or Firm* — Garlick & Markison; Bruce E. Garlick (57) ABSTRACT

A method of forming a part includes: inserting a blank into a die, the die comprising a mold mounted above a sealing counterpart; clamping the blank between the mold and the sealing counterpart; applying first pressure on the blank from the sealing counterpart so the blank is pressed upward to form a shaped part corresponding to the mold; applying a vacuum to the shaped part to hold it against the mold also after separating the mold and the sealing counterpart, the vacuum applied through at least one opening in the mold located in a corner of the mold that the blank does not reach when the first pressure is applied; and discontinuing the vacuum to allow the shaped part to be released from the mold.

20 Claims, 10 Drawing Sheets

(56) References Cited

U.S. PATENT DOCUMENTS

| | | | |
|---|---|---|---|
| 7,112,249 B2* | 9/2006 | Schroth | B21D 26/021 |
| | | | 148/511 |
| 7,730,753 B2* | 6/2010 | Krajewski | B21D 22/201 |
| | | | 148/537 |
| 8,033,138 B2 | 10/2011 | Hori et al. | |
| RE43,012 E | 12/2011 | Rashid | |
| 8,312,742 B1 | 11/2012 | Howse et al. | |
| 2005/0138967 A1* | 6/2005 | Hori | C03B 23/03 |
| | | | 65/106 |
| 2005/0204793 A1* | 9/2005 | Luckey, Jr. | B21D 22/10 |
| | | | 72/60 |
| 2006/0035106 A1 | 2/2006 | Noguchi | |
| 2006/0075799 A1* | 4/2006 | Schroth | B21D 37/16 |
| | | | 72/342.8 |
| 2008/0184764 A1 | 8/2008 | Nakamura et al. | |

* cited by examiner

HIGH SPEED BLOW FORMING PROCESSES

BACKGROUND

Some metal parts are currently manufactured using formation techniques such as cold forming, where a metal blank is pressed into the desired shape. In some situations, superplastic forming is used, such as where cold forming cannot produce the shape of the finished part. However, superplastic forming is a slow process and may be impractical for mass production scenarios, such as in the auto manufacturing industry.

SUMMARY

In a first aspect, a method of forming a part comprises: inserting a blank into a die, the die comprising a mold mounted above a sealing counterpart; clamping the blank between the mold and the sealing counterpart; applying first pressure on the blank from the sealing counterpart so the blank is pressed upward to form a shaped part corresponding to the mold; applying a vacuum to the shaped part to hold it against the mold also after separating the mold and the sealing counterpart, the vacuum applied through at least one opening in the mold located in a corner of the mold that the blank does not reach when the first pressure is applied; and discontinuing the vacuum to allow the shaped part to be released from the mold.

Implementations can include any or all of the following features. The vacuum is applied through multiple openings in the mold, the method further comprising applying second pressure on the shaped part after discontinuing the vacuum, the second pressure applied through the openings and being sequenced so that at least one of the openings is pressurized before at least another one of the openings. The first pressure is applied through a diffuser on the sealing counterpart, the diffuser comprising multiple levels in which a gas passes through a convoluted pathway before moving to a next level. Clamping the blank comprises a hot crash forming that consumes only minimal available elongation from the blank, and wherein applying the first pressure comprises a high speed blow forming operation that generates the shaped part. The method further comprises placing the die into a weldment before inserting the blank, the weldment comprising insulation that allows exchange of the die for another die in a heated state. The method further comprises centering the die in the weldment using a keeper on the weldment, the keeper allowing for thermal expansion and contraction of the die. The method further comprises removing wrinkles while forming the shaped part, the wrinkles removed using at least one pool formed in the mold.

In a second aspect, a method of forming a part comprises: inserting a blank into a die, the die comprising a mold mounted above a sealing counterpart; clamping the blank between the mold and the sealing counterpart; applying first pressure on the blank from the sealing counterpart so the blank is pressed upward to form a shaped part corresponding to the mold, the first pressure applied through a diffuser on the sealing counterpart, the diffuser comprising multiple levels in which a gas passes through a convoluted pathway before moving to a next level; applying a vacuum to the shaped part to hold it against the mold also after separating the mold and the sealing counterpart; and discontinuing the vacuum to allow the shaped part to be released from the mold.

Implementations can include any or all of the following features. The vacuum is applied through multiple openings in the mold, the method further comprising applying second pressure on the shaped part after discontinuing the vacuum, the second pressure applied through the openings and being sequenced so that at least one of the openings is pressurized before at least another one of the openings. The vacuum is applied through at least one opening in the mold located in a corner of the mold that the blank does not reach when the first pressure is applied. Clamping the blank comprises a hot crash forming that consumes only minimal available elongation from the blank, and wherein applying the first pressure comprises a high speed blow forming operation that generates the shaped part. The method further comprises removing wrinkles while forming the shaped part, the wrinkles removed using at least one pool formed in the mold.

In a third aspect, a method of forming a part from aluminum comprises: inserting a blank into a die, the die comprising a mold mounted above a sealing counterpart; clamping the blank between the mold and the sealing counterpart, wherein clamping the blank comprises a hot crash forming that consumes only minimal available elongation from the blank; applying first pressure on the blank from the sealing counterpart so the blank is pressed upward to form a shaped part corresponding to the mold, and wherein applying the first pressure comprises a high speed blow forming operation that generates the shaped part; applying a vacuum to the shaped part to hold it against the mold also after separating the mold and the sealing counterpart; and discontinuing the vacuum to allow the shaped part to be released from the mold.

Implementations can include any or all of the following features. The vacuum is applied through multiple openings in the mold, the method further comprising applying second pressure on the shaped part after discontinuing the vacuum, the second pressure applied through the openings and being sequenced so that at least one of the openings is pressurized before at least another one of the openings. The vacuum is applied through at least one opening in the mold located in a corner of the mold that the blank does not reach when the first pressure is applied. The first pressure is applied through a diffuser on the sealing counterpart, the diffuser comprising multiple levels in which a gas passes through a convoluted pathway before moving to a next level. The method further comprises placing the die into a weldment before inserting the blank, the weldment comprising insulation that allows exchange of the die for another die in a heated state. The method further comprises centering the die in the weldment using a keeper on the weldment, the keeper allowing for thermal expansion and contraction of the die. The method further comprises removing wrinkles while forming the shaped part, the wrinkles removed using at least one pool formed in the mold.

In a fourth aspect, a method of forming a part comprises: placing a die that comprises a mold and a sealing counterpart in a weldment, wherein the mold is a male type mold configured for forming a shaped part, the mold having multiple openings and having at least one pool formed in a scrap area of the shaped part, the sealing plate having an inverse shape based on the male type mold; after placing the die in the weldment, heating the die; moving the weldment with the die to a press; installing the weldment with the die in the press, wherein the mold is mounted above the sealing counterpart; preheating a blank; inserting the blank into the die in the press; performing a hot crash form of the blank by moving at least one of the mold and the sealing counterpart against the other to generate a hot crash form part, wherein the blank is clamped between the mold and the sealing counterpart to form a seal; performing a high speed blow forming of the hot crash form part by blowing air through a diffuser on the sealing counterpart to form the shaped part, the diffuser comprising multiple levels in which the air passes through a convoluted pathway before moving to a next level; applying a vacuum to the shaped part through the openings in the mold to hold the shaped part against the mold, at least some of the openings located in one or more corners of the mold that the blank does not reach when the first pressure is applied; separating the mold and the sealing counterpart after applying the vacuum, wherein the shaped part is held to the mold by the vacuum; placing a carrier underneath the shaped part; perform a sequenced ejection using the openings, the sequenced ejection comprising, for each of the openings: i) ceasing to apply the vacuum, and ii) applying pressurized air through the opening, wherein the pressurized air is applied earlier to certain ones of the openings than others, wherein the shaped part separates from the mold due to gravity; and catching the part on the carrier after the sequenced ejection.

DETAILED DESCRIPTION

This document describes examples of systems and techniques for improved forming of parts in a mass manufacturing process. In particular, a fast part formation can be achieved by combining a hot crash forming step with high speed blow forming. Also, the mold that forms the part can be positioned as the upper part of the die. Some or all of these approaches can be applied in any scenario where parts having complex shapes should be created efficiently. For example, this includes the auto manufacturing industry, where it can allow increased throughput and allow parts to be created that are not possible to make using other techniques.

Parts can be made using a suitably formable material such as aluminum. Among aluminum alloys, the 5000 series has in the past been used for superplastic forming. However, superplastic forming is a relatively slow process because the strain rates are low. For example, it can take 10-15 minutes to form a part depending on its complexity. For mass production purposes, this pace can be impracticably slow, or at a minimum it requires significant lead time in manufacturing, or the ability to process many parts in parallel.

High speed blow forming, on the other hand, is a much faster process than superplastic forming. The present inventors have invented techniques that allow high speed blow forming to be applied to several types of aluminum alloys, including 2000, 5000, 6000 and 7000 series alloys. Materials other than aluminum can also be formed using techniques described herein, including, but not limited to, magnesium, titanium and steel alloys.

High speed blow forming involves applying pressure and/or vacuum to a heated and lubricated metal blank that has been clamped in place, so that the blank conforms to a mold on the opposite side from the pressurize. Examples herein use air as the medium to apply the pressure, but any gas compatible with the blank and the rest of the die can be used. In implementations described herein, the formation by high speed blow forming occurs substantially faster than superplastic forming. For example, a part can be formed in less than 15 seconds. Moreover, high speed blow forming allows for significant elongation of the part. For example, elongations greater than 200% can be obtained in some implementations. The strain rate during high speed blow forming can be on the order of 0.1 mm/mm per second or higher.

The temperature of the high speed blow forming can be selected based at least in part on the material being formed. For example, with aluminum 5000 series the temperatures can range between about 430-490° C., whereas for 2000 and 6000 series the range can include about 470-550° C. For 7000 series the temperature can be relatively lower, such as about 430-550° C. The forming temperature can be selected dependent on the ability to achieve final part shape and to achieve desired properties for hemmability, weldability, corrosion-resistance, superior paint-cosmetics, and dent-resistance, to name a few examples.

One aspect of an improved forming technique can be to precede the main forming stage with a hot crash forming operation. In some implementations, the hot crash forming takes place between the mold for the main forming stage, and a sealing counterpart. For example, a male type mold can crush a heated blank into a corresponding cavity of the sealing counterpart. This initial forming of the blank can account for a significant portion of its deformation. For example, the hot crash forming can produce greater than about 50% of the total shape of the finished part, without any thinning of the blank. This means that the available elongation of the blank material can be used for the final formation into the finished part, such that more advanced and complex shapes can be created.

Placing the mold as the top part of the die can provide significant advantages. For example, it can simplify removal of the finished part, because gravity will tend to pull the part in a direction away from the mold so that no removal tools are necessary, which could otherwise deform the part. If necessary, the part ejection can be assisted by applying pressure to the back of the finished part, and/or using a vacuum cup. Examples herein use air as the medium to apply the pressure, but any gas compatible with the finished part and the rest of the die can be used. As another benefit, having the mold mounted on top avoids the disadvantage that lubricant from the blank falls down on the mold. With bottom mounted molds, on the other hand, the quality of finished parts can be degraded if the mold surface is contaminated by lubricant, dust, contaminants, or any debris coming from insulation, and it may be necessary to clean the mold often.

Figure 1:
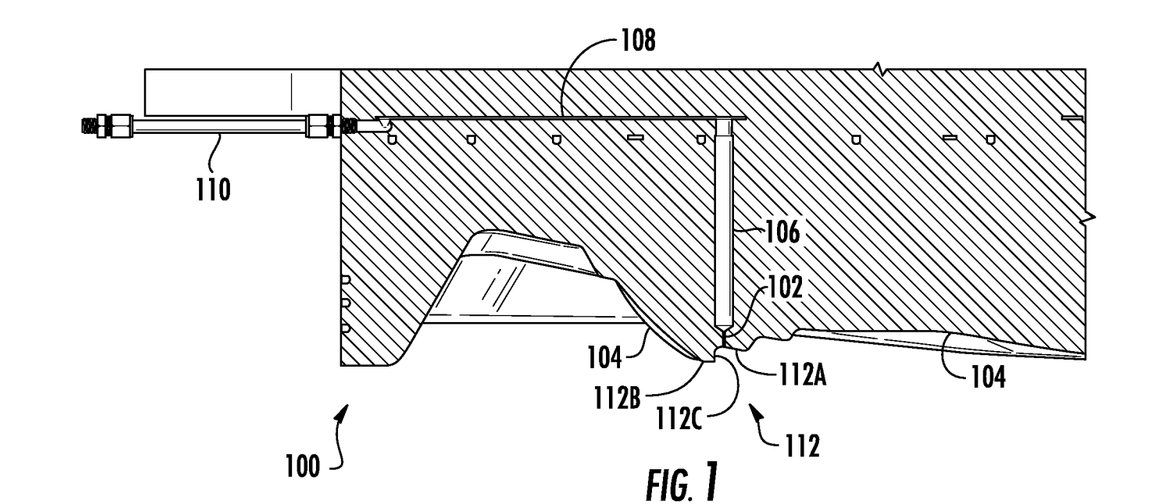
FIG. 1 shows a cross section of an example of a mold having a vacuum opening.

FIG. 1 shows a cross section of an example of a mold having a vacuum opening 102. The mold, only part of which is shown in this example, has shape surfaces 104 that are designed to form a specific part by having the blank pressed against them in substantially all areas. This mold can be mounted as the upper part of the die, so that the blank (not shown) is pressed essentially upwards onto the mold in the manufacturing process.

The vacuum opening 102 is connected to a conduit 106 formed in the mold material. For example, the conduit is wider than the opening, which can be relatively small. The conduit is in turn connected to a tubes 108 (only part of which is visible) that forms part of a vacuum system for the entire mold. Each tube is connected to one or more pipes 110 that serve to supply vacuum or pressurized gas to the cluster and ultimately to the opening 102. For example, the pipes 110 can selectively be connected to a suitable pressurized chamber or vacuum pump.

In some implementations, the opening 102 is a narrow hole. For example, the opening can be on the order of one to a few mm wide. The hole is placed in a corner 112 of the shape surface. At the corner 112 in this example, the shape surface essentially contains a step between a surface 112A and a surface 112B at the corner, the surfaces 112A-B separated by a surface 112C.

During the manufacturing process, the material of the blank will be pushed toward the corner 112 (as well as the rest of the shape surfaces) by the pressurized gas. However, because of the relatively steep surface incline at the corner, the material of the blank may not reach all the way to the bottom of the corner 112. Rather, a moderate size pocket can be formed between the material and the corner. It is in this pocket that the opening 102 is placed. That is, by ensuring that a small chamber exists between the blank material and the vacuum hole, then one can obtain sufficient suction force against the blank to hold it against the mold—and prevent it from falling due to gravity—even when the opening 102 has a very small size. The mold has a number of the vacuum openings 102 placed in selected locations over the surface thereof, and at least some of these locations can be chosen because of their ability to form small pockets surrounding the vacuum opening when the part has been formed. Such locations can be identified by experiment and/or by running a simulation program that predicts how the finished part will conform to the mold in the different shape surfaces.

Figure 2:
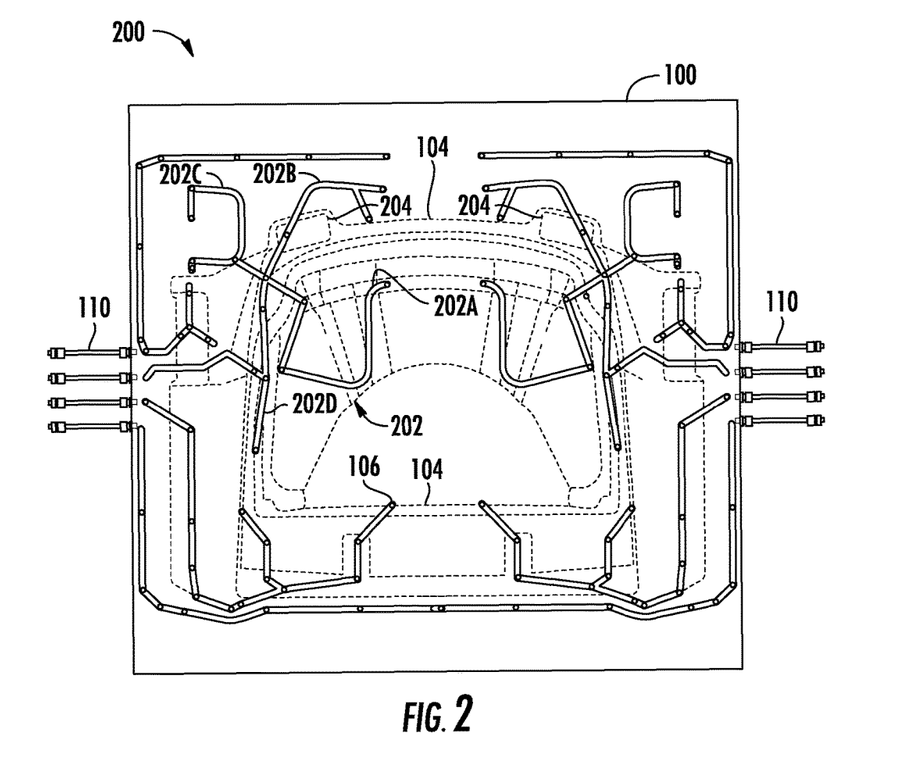
FIG. 2 shows an example of a system for applying vacuum or pressure to a formed part.

FIG. 2 shows an example of a system 200 for applying vacuum or pressure to a formed part. The system includes the mold 100, here seen from a side opposite the shape surfaces 104 which are here shown in phantom. When the mold is installed as the upper part of the die, the current illustration represents a top view of the die.

The system here has the pipes 110 extending on two sides thereof. The pipes are connected to respective ones of multiple clusters 202 that are formed on or inside the mold. Here, one of the clusters has respective branches 202A-D. Each of the branches can consist of one or more of the tubes 108 (FIG. 1), and has at least one of the conduits 106 attached to it.

As mentioned, the system 200 can be used to hold the finished part onto the mold as the die is opened. The system can also be used to perform a sequenced release of the finished part. That is, releasing the vacuum may not be sufficient to release the part from the mold, because it may be sticking in some areas. For this reason, pressurized gas (e.g., air) can be applied through some or all of the openings 102 (FIG. 1). However, some areas of the finished part may have more tendency to stick to the mold than others. It can therefore be advantageous to apply pressure in these areas shortly before other areas, to ensure a more even release of the part and to avoid deformation. For example, one or more of the clusters 202 that have branches along the bead area of the die can be pressurized shortly (e.g., on the order of milliseconds) before one or more other areas.

The shape surfaces 104 can include one or more pools 204. A pool is a depression the shape surface designed to collect some of the blank material during the elongation process. One or more other structures can additionally or alternatively be used. For example, a cavity, a gainer, a flange, and/or a 3D sealing plate can be used. A gainer is in a sense the opposite of a pool in that is rises above the surface. In some implementations, the pools are placed so as to draw excess material away from another region of the mold and thereby eliminate wrinkles or slip lines in that area. For example, computer simulations of the elongation process can be performed to find areas prone to wrinkling, and the pool(s) can then be placed based on that information.

Figure 3:
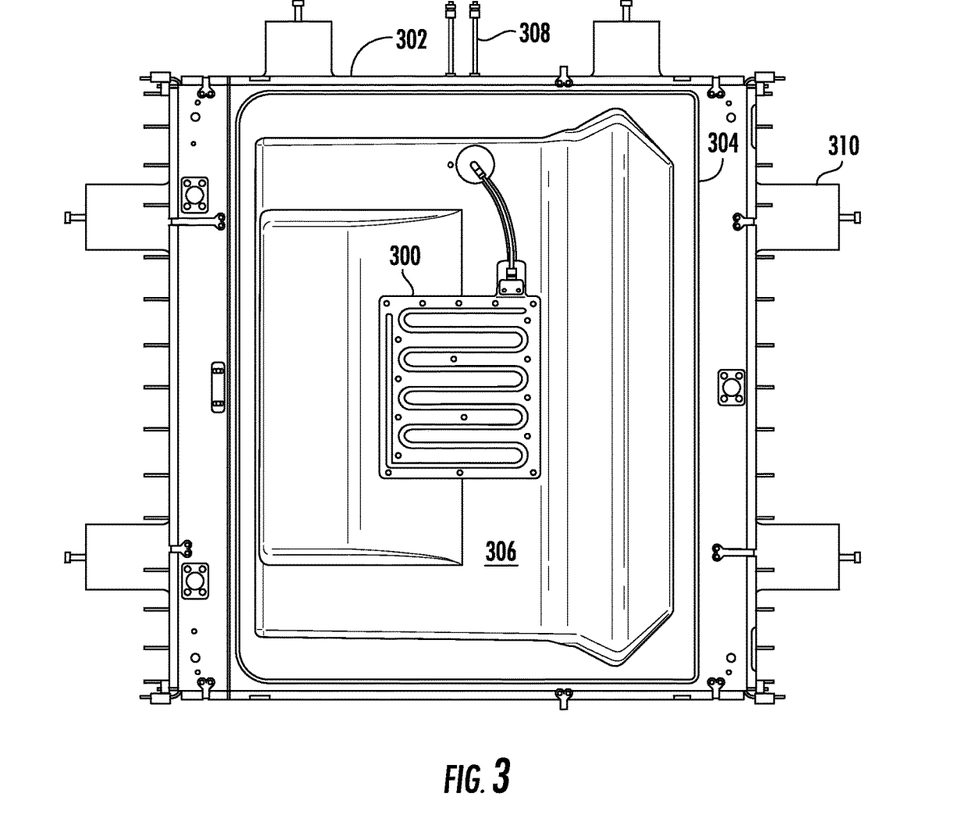
FIG. 3 shows an example of a diffuser in a sealing plate.

FIG. 3 shows an example of a diffuser 300 in a sealing plate 302. The sealing plate can be the opposite part of the die from the mold. For example, when the mold is mounted on top, the sealing counterpart can be placed on the bottom. The sealing plate provides a bead 304 that together with a corresponding bead on the mold serves to form an airtight seal when these parts are clamped together. That is, this allows for pressurization of the chamber for the high speed blow forming process.

Within the perimeter of the bead a cavity 306 is formed. The cavity provides a space for the blank to be forced into during the hot crash forming that can be an initial step before a high speed blow forming operation. That is, when the mold has a male type form, this can be pressed against the blank as the die is clamped together, and that causes the blank to partially enter the cavity 304. The blank need not contact any part of the cavity during such a stage. For example, the side of the blank facing the sealing counterpart can be considered a class A surface that should not touch any part of the die to avoid surface damage, such that the high speed blow forming can provide parts that essentially do not require hand finishing. Rather, the cavity can correspond to the mold in that it allows the mold and the blank being crushed into shape to partially enter the cavity without colliding with any part of the sealing plate.

The diffuser 300 serves to inject pressurized gas into the cavity to press the blank against the mold. In some implementations, the diffuser provides an advantageous way to ensure that the air reaches a proper temperature before being applied to the heated blank. For example, heating the air can accelerate the process and direct air to a less critical area of the part, such as an area where less elongation is needed. The air may initially be supplied at essentially room temperature, whereas the inside of the die is about 500°. The diffuser can include a multilayer structure where the air passes up a stack of plates before being ejected. Here, an example of a serpentine path is shown that the air can take on each plate. The diffuser is supplied using one or more pipes 308.

The sealing plate 302 has keeper spacers 310 positioned at some locations around its perimeter. The mold can have its respective keepers as well. In some implementations, these can serve to ensure proper positioning of the sealing plate during the manufacturing process. For example, thermal expansion and contraction of the sealing plate could otherwise cause it to become misaligned. That is, the keeper spacers can help with centering the sealing plate relative to the rest of the die so that it is free to expand and retract.

Figure 4:
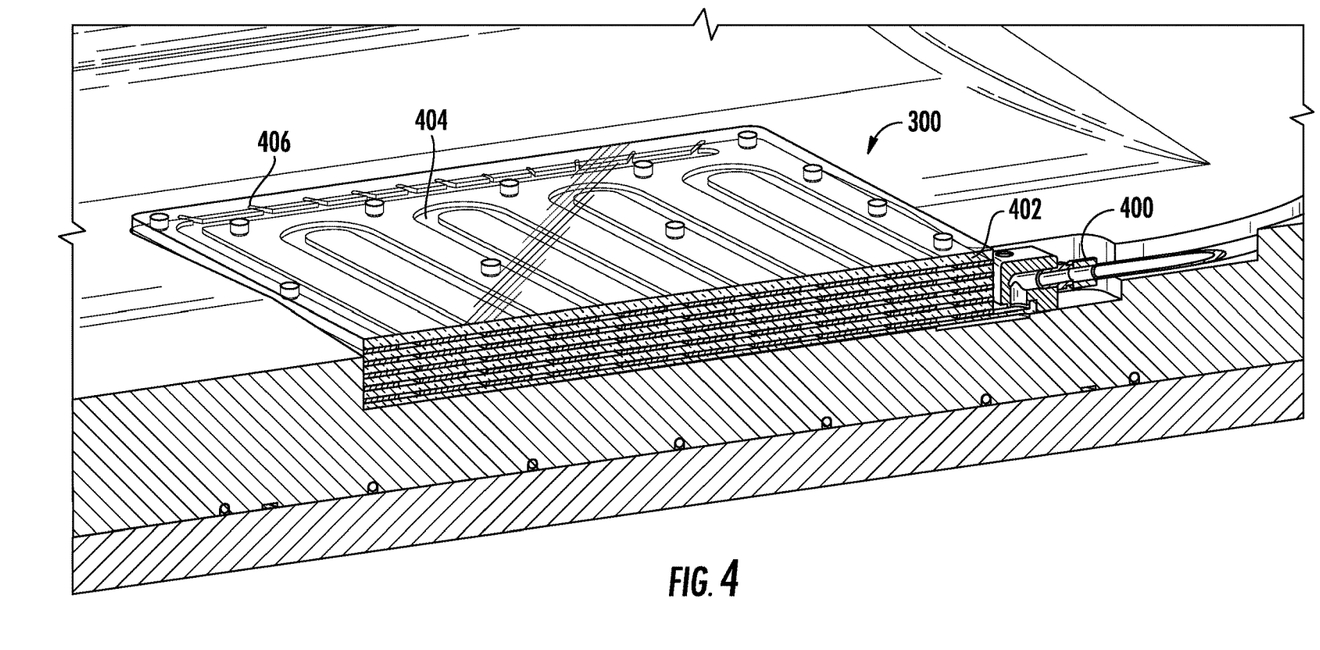
FIG. 4 shows a cross section of the diffuser.

FIG. 4 shows a cross section of the diffuser. An inlet 400 provides a supply of pressurized air. A stack of plates 402 provides a pathway for the air to travel through the diffuser, in this example from the bottom to the top. On its way, the air passes through a serpentine pattern 404 formed in or between respective plates. That is, the diffuser causes the air to travel a substantial distance through structure that has the same or similar temperature as the rest of the die and the blank. The diffuser provides one or more outlets 406 where the incoming air enters the cavity. For example, this flow of air applies the pressure against the heated blank as part of the high speed blow forming process. The outlets 406 can be oriented in one or more directions. For example, the outlets can spread the incoming air in multiple directions to avoid having a large air blast on a critical area of the part.

Figure 5:
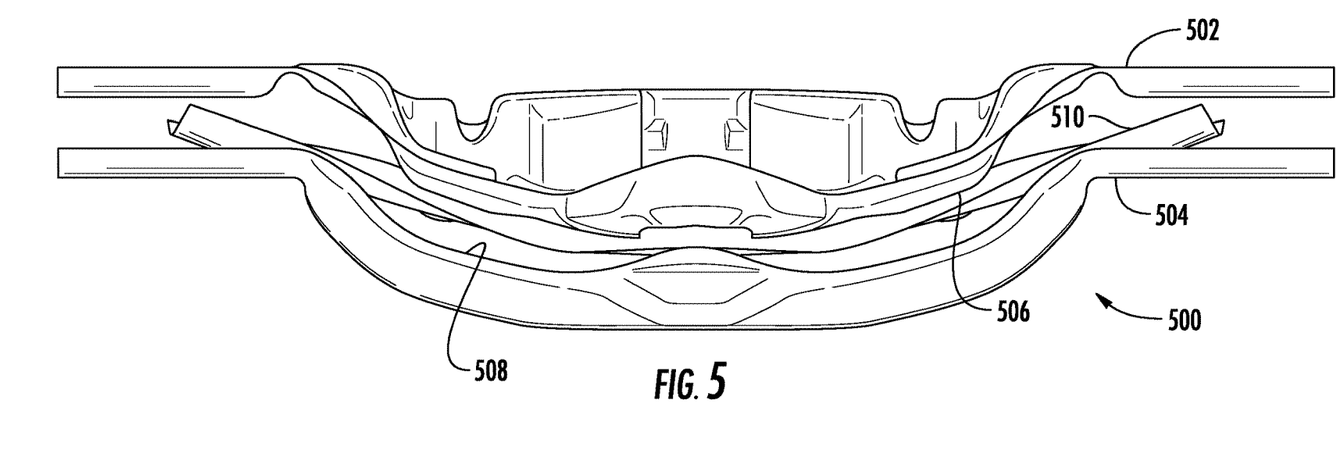
FIG. 5 shows a side view of a die during hot crash forming.

FIG. 5 shows a side view of a die 500 during hot crash forming. The die has a mold 502 that is here positioned on top, and a sealing counterpart 504 on the bottom. The mold has a shape surface 506 that in this example is a male type mold, and the sealing counterpart has a cavity 508 to facilitate hot crash forming. A blank 510 is here shown between the mold and the cavity. The die is currently shown after the hot crash forming has begun, but before it is complete. That is, the blank has begun to deform due to the pressure from the shape surface 506, and may be further deformed as the gap between the mold and the sealing counterpart closes. Eventually, these die parts will clamp down on the blank and form a seal around its center portion, such as using the bead 304 (FIG. 3). However, the hot crash forming uses at most a minimal amount of the available elongation of the material. As used herein, a minimal amount corresponds to less than about five percent of the elongation. Rather, the material can be elongated in a subsequent manufacturing stage, such as during high speed blow forming.

Figure 6:
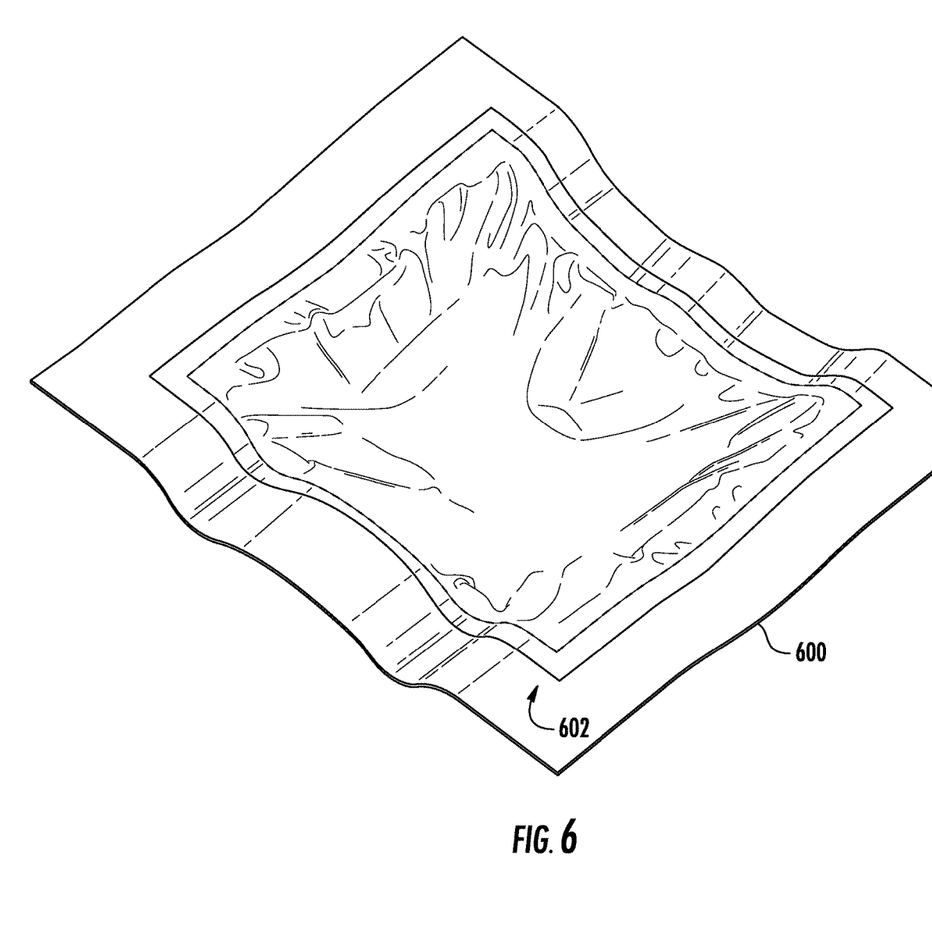
FIG. 6 shows an example of a hot crash formed blank.

FIG. 6 shows an example of a hot crash formed blank 600. For example, this part can be formed by pressing a male type mold against a heated blank in a die that has a cavity for the deformed blank to enter into. A bead area 602 indicates where the clamping between the mold and the sealing counterpart seals the die so that pressure can be applied to further form the part.

Figure 7:
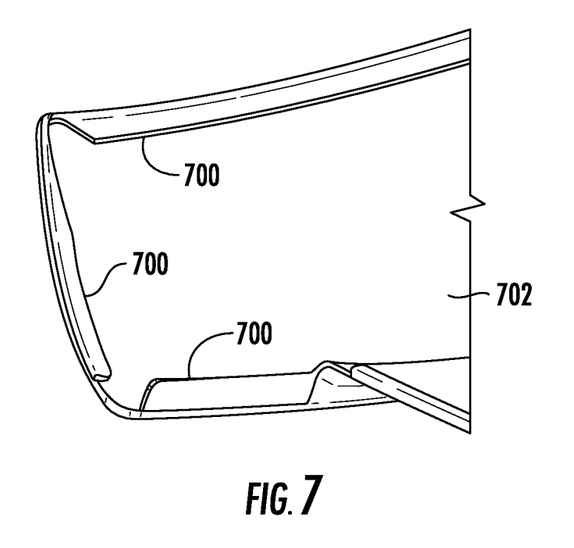
FIG. 7 shows examples of hemmings on a formed part.

FIG. 7 shows examples of hemmings 700 on a formed part 702. The part 702 is here made of a relatively thin gauge and so does not have the structure or stiffness to alone serve as a body part for a vehicle. Rather, this part will be tracked by an inner part (not shown). The hemming, then, requires the material to be compliable for essentially 180 degrees of bending. 6000 series aluminum alloys, for example, sometimes have a very soft state initially, and so hemming may not pose any difficulties. Regarding 5000 series alloys, on the other hand, the high speed blow forming can provide enough compliance in the material so that hemming can be performed. As such, this also benefits use of such techniques in mass production of formed parts.

Figure 8:
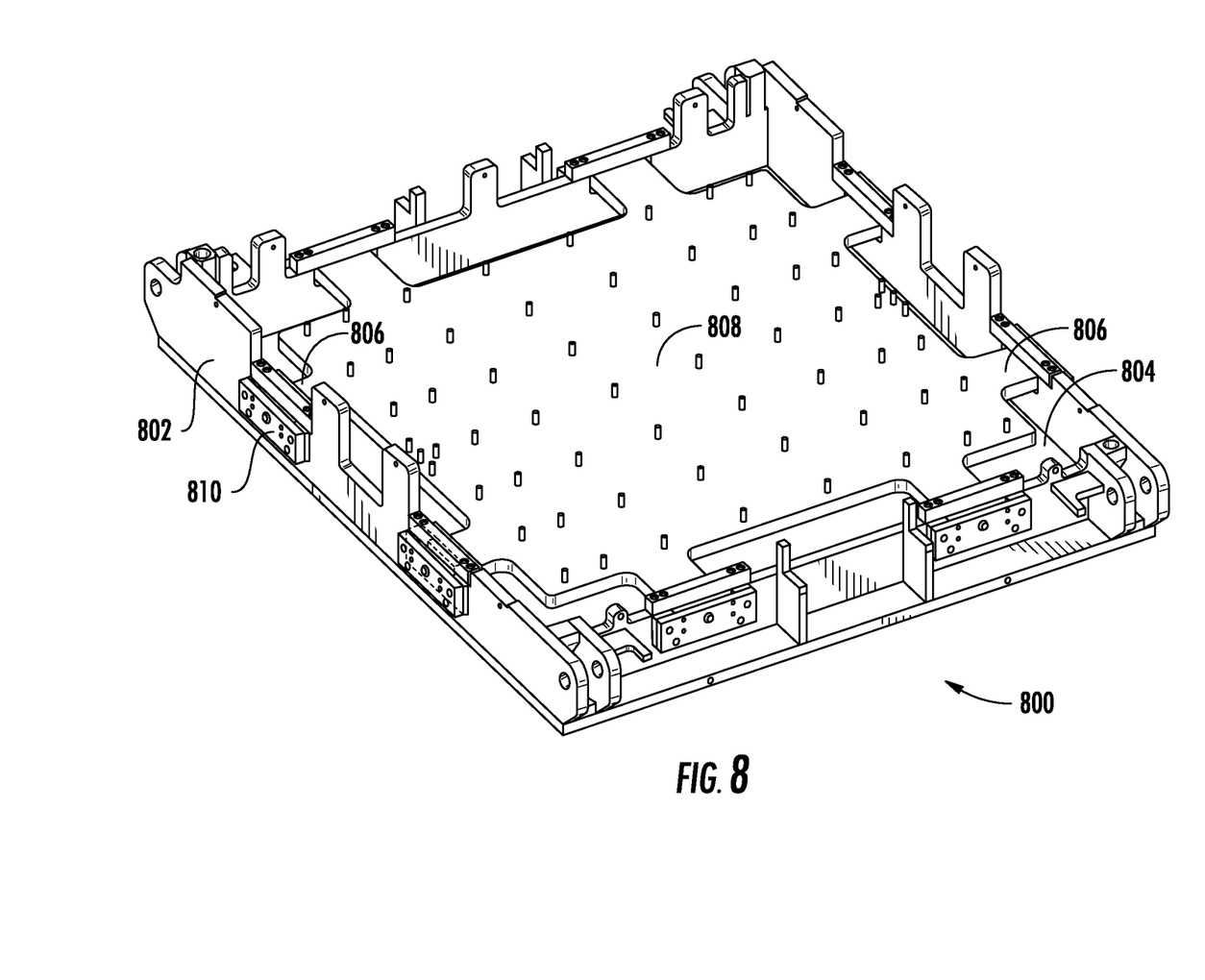
FIG. 8 shows an example of a weldment.

FIG. 8 shows an example of a weldment 800. The weldment includes walls 802 attached to a base 804. The weldment facilitates insulation of the die before, during and after the formation process to make the tool easier to handle. For example, the weldment provides a manipulating point for the die. Once placed in the weldment, the die can remain in the weldment both during manufacturing processes and when not in use. For example, when a die is temporarily taken out of the production line, it is replaced by another die that has its own weldment. That is, the weldment can contain the respective mold and counterpart of the die, each of which can have integrated heaters. Keeper spacers 806 are here extending in several directions from a plate 808 that is attached to the mold or the counterpart. Multiple keepers can be used in the weldment. The plate will be heated as a result of heating the die. The keeper spacers pass through insulated openings in the walls and have insulated keeper blocks positioned at their ends.

Figure 9:
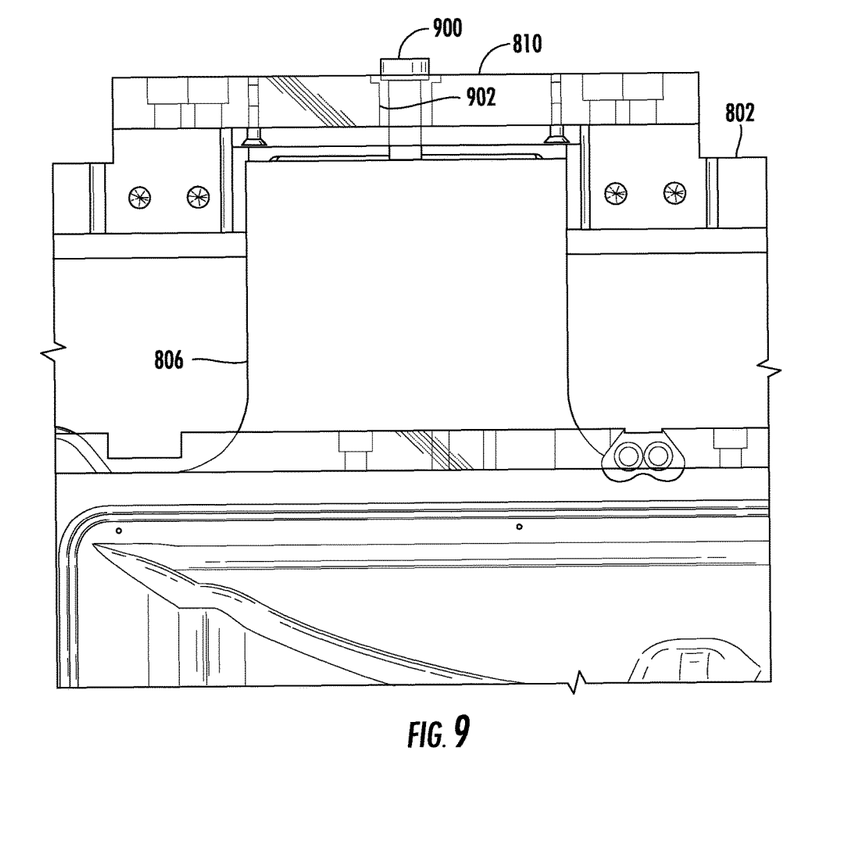
FIG. 9 shows an example of the keeper on the weldment.

FIG. 9 shows an example of the keeper on the weldment. This illustration shows the spacer 806 passing through the opening in the wall 802, and the position of the keeper block 810. Here, a bolt 900 is attached to the end of the keeper spacer, the bolt passing through an opening 902 in the keeper block. For example, the keeper approach accommodates thermal expansion and contraction related to the heating of the die while maintaining the alignment between the mold and the counterpart so that the bead seals properly.

Figure 10:
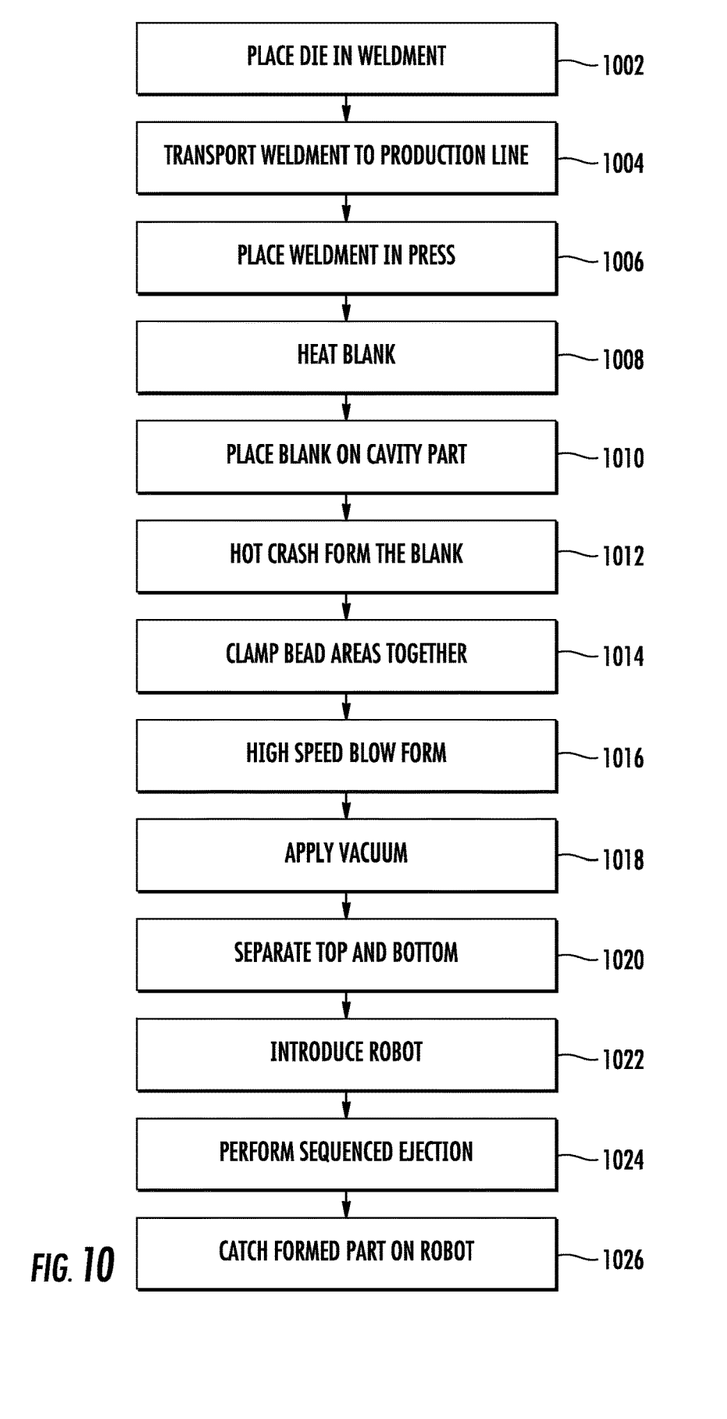
FIG. 10 shows an example of a process.

FIG. 10 shows an example of a process 1000. At 1002, a die is placed in a weldment. For example, the die and/or the weldment is configured for heating the die while positioned in the weldment. As another example, the die can be heated before being placed in the weldment. At 1004, the weldment can be transported to the production line where it is to be used. Some implementations are used for mass production of parts, and there it can be important to be able to efficiently changeover from one die to another. For example, the ability to bring an already heated die (in its own weldment) to replace the currently used die can significantly improve the efficiency, such as by allowing a rotation between several dies without significant production stops. At 1006, the weldment is placed in the press. For example, the mold is positioned on top and a sealing counterpart can be positioned on the bottom.

At 1008, a blank is preheated. Any suitable heating technique can be used. Lubrication can also be applied to the blank. At 1010, the blank is placed on the part of the die that has a cavity. For example, this is the sealing counterpart that has a cavity for the hot crash forming and an air distribution mechanism, such as a diffuser. At 1012, the heated blank is hot crash formed. This can be done as described above with reference to FIG. 5. For example, the hot crash forming takes only as long as the press needs to close the die parts together, such as a few seconds. The result is a hot crash formed part that has been partially deformed towards its final shape. For example, more than about 50% of the deformation of the final shape can come from the hot crash forming. At 1014, the end of the hot crash forming, the blank is clamped between the mold and the sealing counterpart. For example, a bead area can provide a tight seal around the periphery of the blank.

At 1016, the hot crash formed part is high speed blow formed into its final shape. In some implementations, this involves applying high pressure on the part from the side opposite the mold, so that the part is elongated, and otherwise deformed, towards the shape of the mold. The length of time that air pressure is applied, and the pressure level, can both be controlled. The pressure can be increased for an amount of time and thereafter be held constant, as a plateau in the process, after which the pressurization can again increase, or be decreased. For example, this can relieve some stress in the material. The high speed blow forming operation can take on the order of 10-20 seconds, or a few minutes. The forming time is determined by the elongation needed after the hot crash form to achieve the final shape for a particular strain rate.

At 1018, vacuum is applied to the finished part. In some implementations, the vacuum is applied through openings in the mold, which is the upper part of the die. For example, some of the openings can be relatively small, but a sufficient area for holding the part in place is obtained by having placed the openings near corners or other sharp turns of the mold where the blank material does not reach during the high speed blow forming. At 1020, the top and bottom of the die are separated. For example, this involves lifting the mold, or lowering the sealing counterpart, or both. The part is held in place against the mold by way of the applied vacuum.

At 1022, a robot, for example an automated shuttle, is introduced between the parts of the die. For example, the robot can be placed closely underneath the finished part without touching it. The robot is positioned to catch the part as it is released from the mold so as to remove it from the die. At 1024, a sequenced ejection is performed. In some implementations, this involves turning off the vacuum and applying pressurized air through the openings. For example, some openings can be pressurized before others for a balanced ejection, to avoid or reduce bending or deformation of the finished part. In some implementations, a diffuser (e.g., similar to the one described above) can be used on the mold for ejecting the part, alone or in combination with the vacuum openings. At 1026, the finished part is caught on the robot. In some implementations, the robot can have a vacuum cup as a seat for the part. For example, the vacuum on the robot can be applied on a scrap portion of the finished part.

In some implementations, more or fewer steps than described above can be performed. As another example, two or more steps can be performed in a different order.

Forming techniques described herein can provide advantages also in the finished part, besides the efficiency of the manufacturing process. In some implementations, vehicle parts are formed that are not possible to make using other approaches. For example, a so-called ducktail on a vehicle liftgate or trunk can feature a ridge along most of its width. Such a ridge can have several complex features, for example simultaneous curvature from several perspectives—such as sideways, front and top—that are not possible to manufacture using cold forming. As addressed earlier, superplastic forming may be too slow for use in mass production of vehicles. Moreover, the ducktail might have a sharp radius of curvature at the tip of the edge. For example, cold formed ducktails of aluminum can have edges with curvature radii of around 8 mm in order to meet yield requirements, whereas with present techniques it may be possible to achieve less than half such radius, for example down to a radius of curvature of a few millimeters. That is, such a ridge can have a significantly sharper edge than what is created using some existing techniques. This has aesthetic advantages, in that the part is more well-defined and gives more opportunity for using forming techniques to add to the styling of the vehicle. Moreover, such features can have advantages from an aerodynamic point of view, which is important to improve the mileage or range of vehicles. For example, in an electric vehicle a sharp edge on a vehicle trunk or rear liftgate can improve the vehicle's range. As another example, a sharp tailgate ridge can eliminate the need for a separate spoiler in that location.

A number of implementations have been described as examples. Nevertheless, other implementations are covered by the following claims.

What is claimed is:

1. A method of forming a part, the method comprising:
    inserting a blank into a die, the die comprising a mold mounted above a sealing counterpart;
    clamping the blank between the mold and the sealing counterpart;
    applying first pressure on the blank from the sealing counterpart so the blank is pressed upward to form a shaped part corresponding to the mold;
    applying a vacuum to the shaped part to hold it against the mold also after separating the mold and the sealing counterpart, the vacuum applied through at least one opening in the mold located in a corner of the mold that the blank does not reach when the first pressure is applied; and
    discontinuing the vacuum to allow the shaped part to be released from the mold.

2. The method of claim 1, wherein the vacuum is applied through multiple openings in the mold, the method further comprising applying second pressure on the shaped part after discontinuing the vacuum, the second pressure applied through the openings and being sequenced so that at least one of the openings is pressurized before at least another one of the openings.

3. The method of claim 1, wherein the first pressure is applied through a diffuser on the sealing counterpart, the diffuser comprising multiple levels in which a gas passes through a convoluted pathway before moving to a next level.

4. The method of claim 1, wherein clamping the blank comprises a hot crash forming that consumes only minimal available elongation from the blank, and wherein applying the first pressure comprises a high speed blow forming operation that generates the shaped part.

5. The method of claim 1, further comprising placing the die into a weldment before inserting the blank, the weldment comprising insulation that allows exchange of the die for another die in a heated state.

6. The method of claim 5, further comprising centering the die in the weldment using a keeper on the weldment, the keeper allowing for thermal expansion and contraction of the die.

7. The method of claim 1, further comprising removing wrinkles while forming the shaped part, the wrinkles removed using at least one pool formed in the mold.

8. A method of forming a part, the method comprising:
    inserting a blank into a die, the die comprising a mold mounted above a sealing counterpart;
    clamping the blank between the mold and the sealing counterpart;
    applying first pressure on the blank from the sealing counterpart so the blank is pressed upward to form a shaped part corresponding to the mold, the first pressure applied through a diffuser on the sealing counterpart, the diffuser comprising multiple levels in which a gas passes through a convoluted pathway before moving to a next level;
    applying a vacuum to the shaped part to hold it against the mold also after separating the mold and the sealing counterpart; and
    discontinuing the vacuum to allow the shaped part to be released from the mold.

9. The method of claim 8, wherein the vacuum is applied through multiple openings in the mold, the method further comprising applying second pressure on the shaped part after discontinuing the vacuum, the second pressure applied through the openings and being sequenced so that at least one of the openings is pressurized before at least another one of the openings.

10. The method of claim 8, wherein the vacuum is applied through at least one opening in the mold located in a corner of the mold that the blank does not reach when the first pressure is applied.

11. The method of claim 8, wherein clamping the blank comprises a hot crash forming that consumes only minimal available elongation from the blank, and wherein applying the first pressure comprises a high speed blow forming operation that generates the shaped part.

12. The method of claim 8, further comprising removing wrinkles while forming the shaped part, the wrinkles removed using at least one pool formed in the mold.

13. A method of forming a part from aluminum, the method comprising:
inserting a blank into a die, the die comprising a mold mounted above a sealing counterpart;
clamping the blank between the mold and the sealing counterpart, wherein clamping the blank comprises a hot crash forming that consumes only minimal any available elongation from the blank;
applying first pressure on the blank from the sealing counterpart so the blank is pressed upward to form a shaped part corresponding to the mold, and wherein applying the first pressure comprises a high speed blow forming operation that generates the shaped part;
applying a vacuum to the shaped part to hold it against the mold also after separating the mold and the sealing counterpart; and
discontinuing the vacuum to allow the shaped part to be released from the mold.

14. The method of claim 13, wherein the vacuum is applied through multiple openings in the mold, the method further comprising applying second pressure on the shaped part after discontinuing the vacuum, the second pressure applied through the openings and being sequenced so that at least one of the openings is pressurized before at least another one of the openings.

15. The method of claim 13, wherein the vacuum is applied through at least one opening in the mold located in a corner of the mold that the blank does not reach when the first pressure is applied.

16. The method of claim 13, the first pressure applied through a diffuser on the sealing counterpart, the diffuser comprising multiple levels in which a gas passes through a convoluted pathway before moving to a next level.

17. The method of claim 13, further comprising placing the die into a weldment before inserting the blank, the weldment comprising insulation that allows exchange of the die for another die in a heated state.

18. The method of claim 17, further comprising centering the die in the weldment using a keeper on the weldment, the keeper allowing for thermal expansion and contraction of the die.

19. The method of claim 13, further comprising removing wrinkles while forming the shaped part, the wrinkles removed using at least one pool formed in the mold.

20. A method of forming a part, the method comprising:
placing a die that comprises a mold and a sealing counterpart in a weldment, wherein the mold is a male type mold configured for forming a shaped part, the mold having multiple openings and having at least one pool formed in a scrap area of the shaped part, the sealing plate having an inverse shape based on the male type mold;
after placing the die in the weldment, heating the die;
moving the weldment with the die to a press;
installing the weldment with the die in the press, wherein the mold is mounted above the sealing counterpart;
preheating a blank;
inserting the blank into the die in the press;
performing a hot crash form of the blank by moving at least one of the mold and the sealing counterpart against the other to generate a hot crash form part, wherein the blank is clamped between the mold and the sealing counterpart to form a seal;
performing a high speed blow forming of the hot crash form part by blowing air through a diffuser on the sealing counterpart to form the shaped part, the diffuser comprising multiple levels in which the air passes through a convoluted pathway before moving to a next level;
applying a vacuum to the shaped part through the openings in the mold to hold the shaped part against the mold, at least some of the openings located in one or more corners of the mold that the blank does not reach when the first pressure is applied;
separating the mold and the sealing counterpart after applying the vacuum, wherein the shaped part is held to the mold by the vacuum;
placing a carrier underneath the shaped part;
performing a sequenced ejection using the openings, the sequenced ejection comprising, for each of the openings: i) ceasing to apply the vacuum, and ii) applying pressurized air through the opening, wherein the pressurized air is applied earlier to certain ones of the openings than others, wherein the shaped part separates from the mold due to gravity; and
catching the part on the carrier after the sequenced ejection.

* * * * *